(12) United States Patent
Colonna et al.

(10) Patent No.: US 11,405,333 B2
(45) Date of Patent: Aug. 2, 2022

(54) SWITCHED FABRIC NETWORK ROUTING MODE SUPPORT

(71) Applicant: International Business Machines Corporation, Armonk, NY (US)

(72) Inventors: Christopher J. Colonna, Ossining, NY (US); Pasquale A. Catalano, Wallkill, NY (US); Michael James Becht, Poughkeepsie, NY (US); Stephen Robert Guendert, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 133 days.

(21) Appl. No.: 16/897,348

(22) Filed: Jun. 10, 2020

(65) Prior Publication Data
US 2021/0392088 A1    Dec. 16, 2021

(51) Int. Cl.
*H04L 12/947* (2013.01)
*H04L 12/931* (2013.01)
*H04L 49/25* (2022.01)
*H04L 49/356* (2022.01)

(52) U.S. Cl.
CPC ............ *H04L 49/25* (2013.01); *H04L 49/356* (2013.01)

(58) Field of Classification Search
CPC .............................. H04L 49/25; H04L 49/356
USPC ........................................................ 370/329
See application file for complete search history.

(56) References Cited

U.S. PATENT DOCUMENTS

| | | | | |
|---|---|---|---|---|
| 5,802,287 | A | * | 9/1998 | Rostoker ............. H04L 49/9021 370/395.5 |
| 8,351,442 | B1 | | 1/2013 | McGlaughlin |
| 8,644,317 | B1 | | 2/2014 | Dropps |
| 9,032,095 | B1 | | 5/2015 | Traina et al. |
| 9,720,733 | B1 | | 8/2017 | Konda |
| 2005/0018673 | A1 | * | 1/2005 | Dropps ................... H04L 49/25 370/389 |
| 2007/0130295 | A1 | * | 6/2007 | Rastogi ............... H04L 41/0893 709/220 |
| 2010/0262685 | A1 | | 10/2010 | Dale |
| 2011/0141906 | A1 | | 6/2011 | Ghosh |
| 2011/0153905 | A1 | | 6/2011 | Otani et al. |

(Continued)

OTHER PUBLICATIONS

Cisco, "Configuring fibre channel routing services and protocols," https://www.cisco.com/en/US/docs/storage/san_switches/mds9000/sw/rel_3_x/configuration/guides/fm_3_3_1/fspf.html (retrieved Mar. 23, 2020), 12 pages.

(Continued)

*Primary Examiner* — Faisal Choudhury
(74) *Attorney, Agent, or Firm* — Cantor Colburn LLP; Edward Wixted

(57) ABSTRACT

Embodiments include methods, systems, and computer program products for routing mode support in a switched fabric network. A fabric login payload is built at a device to establish a plurality of communication parameters with a switched fabric network. A routing mode capability of the device is determined. One or more routing support bits are configured in the fabric login payload based on the routing mode capability of the device. The fabric login payload is sent to the switched fabric network to establish communication between the device and a network device of the switched fabric network.

20 Claims, 5 Drawing Sheets

(56) References Cited

U.S. PATENT DOCUMENTS

| | | |
|---|---|---|
| 2012/0163174 A1 | 6/2012 | Shukla et al. |
| 2012/0163395 A1 | 6/2012 | Shukla et al. |
| 2013/0148663 A1 | 6/2013 | Xiong |
| 2015/0286416 A1* | 10/2015 | Astigarraga ............ H04L 43/50 709/224 |
| 2015/0288570 A1 | 10/2015 | Astigarraga et al. |
| 2015/0358202 A1 | 12/2015 | Varble et al. |
| 2016/0196365 A1 | 7/2016 | Astigarraga et al. |
| 2018/0013614 A1 | 1/2018 | Vobbilisetty |
| 2018/0097714 A1 | 4/2018 | Dasu |
| 2018/0109443 A1* | 4/2018 | Srinivasan .............. H04L 49/25 |
| 2018/0367371 A1 | 12/2018 | Nagarajan et al. |
| 2019/0081881 A1* | 3/2019 | Ranjal ..................... H04L 49/25 |
| 2019/0173736 A1 | 6/2019 | Ponnuswamy et al. |
| 2019/0182135 A1 | 6/2019 | Bharadwaj |

OTHER PUBLICATIONS

List of IBM Patents or Patent Applications Treated as Related, Jun. 10, 2020, 2 pages.
U.S. Appl. No. 16/897,362, filed Jun. 10, 2020, Entitled: Switched Fabric Network Routing Mode Selection, First Named Inventor: Pasquale A. Catalano.

* cited by examiner

400

402 — Build a fabric login payload at a device to establish a plurality of communication parameters with a switched fabric network

404 — Determine a routing mode capability of the device

406 — Configure one or more routing support bits in the fabric login payload based on the routing mode capability of the device

408 — Send the fabric login payload to the switched fabric network to establish communication between the device and a network device of the switched fabric network

FIG. 4

SWITCHED FABRIC NETWORK ROUTING MODE SUPPORT

BACKGROUND

The present invention generally relates to computer networks, and more specifically, to routing mode support in a switched fabric network.

During normal operation of a switched fabric network, devices connect to network components, such as switches, using a login message with a payload that describes supported communication parameters and other such information. The network component can verify whether the current network policies support the capabilities of devices attempting to establish communication. In some environments, if all of the connected hosts and devices support a particular communication policy, then the communication configuration may be limited to match features supported by all of the nodes of the switched fabric network.

SUMMARY

Embodiments of the present invention are directed to methods, systems, and computer program products for routing mode support in a switched fabric network. A fabric login payload is built at a device to establish a plurality of communication parameters with a switched fabric network. A routing mode capability of the device is determined. One or more routing support bits are configured in the fabric login payload based on the routing mode capability of the device. The fabric login payload is sent to the switched fabric network to establish communication between the device and a network device of the switched fabric network.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts a flow diagram of a method for generating a fabric login payload with dynamic routing mode support, in accordance with an embodiment of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Exemplary embodiments include methods, systems and computer program products for performing routing mode configuration during fabric login in a switched fabric network. One example of a switched fabric network can include a storage area network (SAN), where a host or other device communicates through one or more switches to connected devices, such as control units of storage arrays. The switches may also be referred to as directors having fabric controllers with routing policies. In exemplary embodiments, as a device initiates a connection to a switched fabric network, the device can incorporate an indication of routing mode capability in a fabric login payload. The switched fabric component receiving the fabric login payload can determine whether other connected devices also support the routing mode capability of the device performing the fabric login. If the device routing policy is compatible with the routing mode capability, then the login can complete. If the routing mode capability is not currently in use but is supported by the devices connected to the switched fabric network, then the fabric routing policy can be updated to support enhanced routing between the devices. In some embodiments, changes to the routing mode may be denied where alternate routing modes are disabled even though such routing modes could be enabled, e.g., where fixed latency of static routing is desired over dynamic routing with variable latency.

Figure 1:
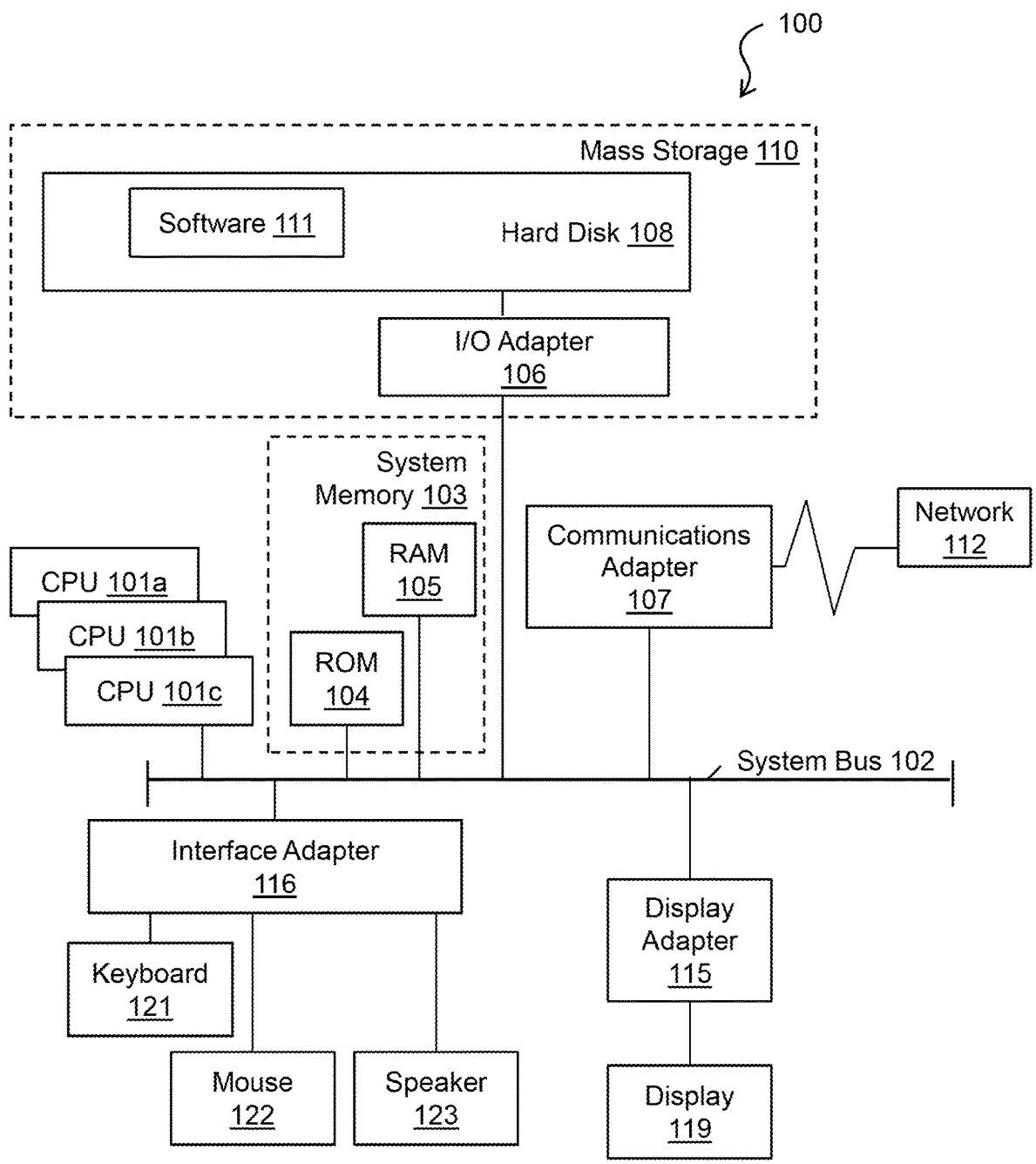
FIG. 1 is a schematic diagram of a computer system, in accordance with an embodiment of the invention.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101*a*, 101*b*, 101*c*, etc. (collectively or generically referred to as processor(s) 101 and/or a processing system). The processors 101 can be a single-core processor, multi-core processor, computing cluster, or any number of other configurations. The processors 101, also referred to as processing circuits or processing systems, are coupled via a system bus 102 to a system memory 103 and various other components. The system memory 103 can include a read only memory (ROM) 104 and a random-access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems as a computer-readable storage medium for storing executable program instructions and/or data.

The computer system 100 comprises an input/output (I/O) adapter 106 and a communications adapter 107 (also referred to as a network interface) coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible computer-readable storage medium readable by the processors 101, where the software 111 is stored as instructions for execution by the processors 101 to cause the computer system 100 to operate, such as is described herein below with respect to the various Figures. Examples of computer program products and the execution of such instruction is discussed herein in more detail. The communications adapter 107 interconnects the system bus 102 with a network 112, which may be an outside network, enabling the computer system 100 to communicate with other such systems. In embodiments, the network 112 can include a switched fabric network. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) can be connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119. In some embodiments, components such as the display 119, keyboard 121, mouse 122, and speaker 123 can be omitted, where such user interfaces are not needed.

In some embodiments, the communications adapter 107 can transmit data using any suitable interface or protocol, such as internet small computer system interface, Fibre Connection, Fibre Channel, Ethernet, among others. The network 112 may be a cellular network, a radio network, a wide area network (WAN), a local area network (LAN), a storage area network (SAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
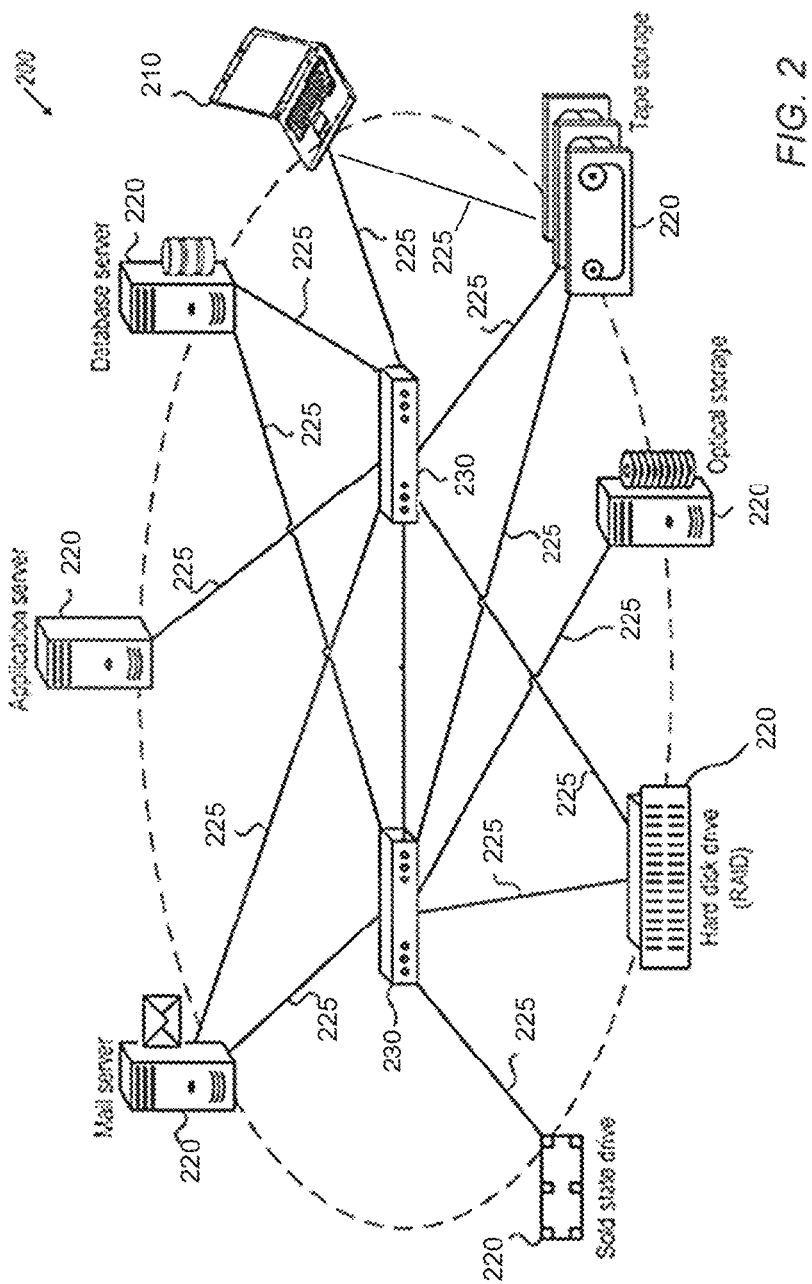
FIG. 2 is a schematic diagram of a switched fabric network, in accordance with an embodiment of the invention.

FIG. 2 is a diagram of a switched fabric network 200, in accordance with an embodiment. The switched fabric network 200 includes a plurality of end devices 210, 220 that are each connected to one or more network devices 230, such as switches. Network devices 230 include memory circuitry and processing circuitry (e.g. including monitoring circuitry and limiting circuitry). The network topology of switched fabric network 200 may be a switched fabric, where network devices 230 are switches. In some embodiments, a particular switch 230 may be set to switch mode or N Port ID virtualization (NPIV) mode. In exemplary embodiments, at least one of the end devices 210, 220 in the switched fabric network 200 is configured as a host device 210. In one embodiment, the host device 210 is embodied in a computer system, such as the one shown in FIG. 1. Paths between end devices 210, 220 and through the network devices 230 can form one or more storage area networks.

In exemplary embodiments, each of the network devices 230 includes a plurality of ports that connect the network devices 230 to various end devices 210, 220 via links 225. In addition, each end device 210, 220 includes one or more ports that connect the end devices 210, 220 to one or more network devices 230 or to other end devices 210, 220. In exemplary embodiments, each link 225 is defined by the two ports that are connected to the link 225. The ports of end devices 210, 220 are referred to as channel ports while the ports of the network devices 230 are referred to as switch ports.

In exemplary embodiments, the network devices 230 support the Fibre Channel (FC), Fibre Connection (FICON), and/or Fibre channel over Ethernet (FCoE) Protocols. For example, a particular fixed port network device may support the FC protocol and/or the FCoE protocol. As another example, if a particular network device includes a plurality of line cards, at least some of which may support the FC protocol and/or at least some of which may support the FCoE protocol. It is noted that a particular port on a particular network device 230 may support the FC protocol or the FCoE protocol by default or as configured (e.g., if the particular port is a universal port). Optionally, network devices 230 support one or more other protocols such as simple network management protocol (SNMP) for collecting information, e.g. for output on management device 210. As a further example, the devices 210, 220, 230 may support dynamic routing through FICON Dynamic Routing (FiDR), Exchange Based Routing (EBR), Source/Destination/Exchange (Src/Dest/OxID) routing, etc.

Figure 3:
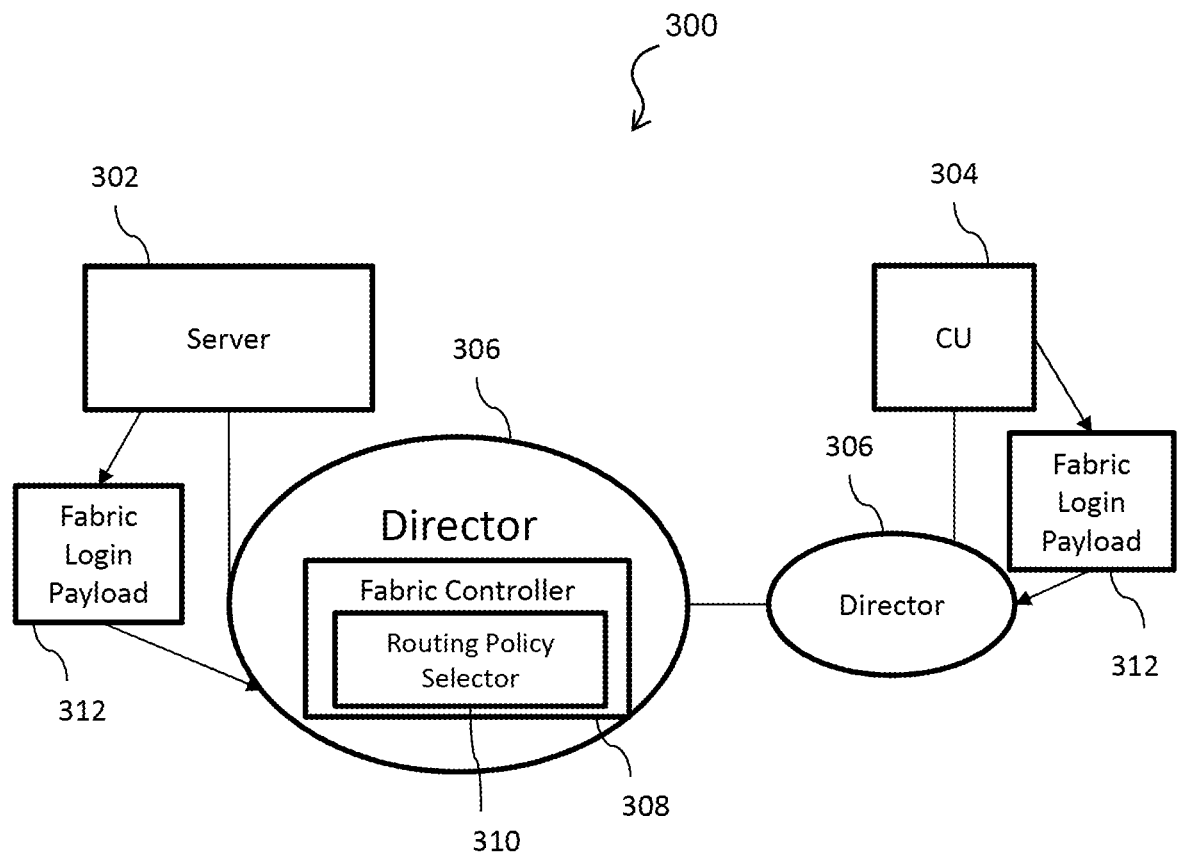
FIG. 3 is a schematic diagram of a path through a switched fabric network, in accordance with an embodiment of the invention.

Referring now to FIG. 3, a schematic diagram of a path 300 through a switched fabric network, such as the switched fabric network 200 of FIG. 2, is depicted. The path 300 connects a server 302 as a first device to a control unit 304 as a second device through one or more switching devices 306. For example, the control unit (CU) 304 can be part of a storage array where the connections with the switching devices 306 form a storage area network. The switching devices 306 may also be referred to as directors that include a fabric controller 308 and a routing policy selector 310 in addition to other elements (not depicted). The fabric controller 308 can negotiate connections between ports of the server 302 and control unit 304. The routing policy selector 310 can select from one or more routing policies to determine connection characteristics of the switched fabric network between the server 302 and control unit 304. For example, where there are multiple possible paths through switching devices 306, a routing policy can be configured to support static routing, dynamic routing, or other routing modes. A static routing policy establishes a predictable communication path between ports of the server 302 and control unit 304 such that performance is predictable with a substantially fixed latency. A dynamic routing policy may seek to find the most efficient path between the server 302 and control unit 304 or it may distribute traffic evenly across all paths, and as such, performance may change over time depending upon network traffic and priority changes. Other routing modes may be defined by network administrators or as part of protocol specific standards. As one example, a customized routing policy may define a portion of the path 300 as static routing with dynamic routing supported on another portion of the path 300. Other variations and routing modes are also contemplated.

A device, such as server 302 or control unit 304, can send a fabric login payload 312 as part of a fabric login request to a switching device 306 in order to establish communication through the network fabric. The server 302, control unit 304, and switching devices 306 may all be embodiments of the computer system 100 of FIG. 1, including processors 101, system memory 103, communication adapters 107, and other such components to support instruction execution and provide communication buffering. A fabric controller 308 at each switching device 306 can parse the fabric login payload 312 to extract parameters that define how communications should be managed and determine whether the parameters comply with a routing policy of the switching device 306. Where multiple routing policies can be supported by the server 302, control unit 304, and switching devices 306, the routing policy selector 310 may compare factors such as latency, throughput, connection quality, and other such metrics to determine which of the routing policies is most likely to have a desired (e.g., most efficient) performance result and selects the corresponding routing policy. In some cases, when a change between routing policies is identified by the routing policy selector 310, the routing policy selector 310 can request that the fabric controller 308 send an update to other connected components (e.g., server 302, control unit 304, and/or other switching devices 306) of the change. The connected components may alter their respective configuration parameters to take advantage of the change, such as any modifications needed to change from static routing to dynamic routing support.

FIG. 4 depicts a flow diagram of a method 400 for generating a fabric login payload with dynamic routing mode support, in accordance with an embodiment of the invention. The method 400 is described in further reference to FIGS. 1-3 as a computer-implemented method. As shown at block 402, the method 400 includes building a fabric login payload at a device to establish a plurality of communication parameters with a switched fabric network, such as an end device 210, 220 of switched fabric network 200 and fabric login payload 312. A fabric login request (FLOGI) can identify multiple connection aspects, such as identifying ports and exchanging buffer credits for flow control through a network device 230, such as a switch. A fabric login payload can include a plurality of fabric login parameters. For example, the fabric login payload 312 may include common service parameters, port name, node switch fabric name, and other such values. The common service parameters can include configuration information, such as buffer-to-buffer credits, common features, buffer-to-buffer state change number, buffer-to-buffer receive data field size, and other such parameters. The routing mode capability of the device can be determined based on one or more configuration parameters of the device, and the routing mode capability of the device can be configurable on a per-port basis. As one example, one or more predetermined bit fields of the common service parameters, such as bits 29-31 of word 2 can be used to define a routing mode capability. For instance, bit 31 may define dynamic routing support and bits 29-30 can be reserved for alternate routing modes. Clearing bits 29-31 may indicate no support for dynamic or future routing modes, such as where only a static routing mode is supported. Thus, one or more routing support bits can be selectable between a plurality of routing modes. It will be understood that the particular words and bits are provided as an example and routing mode support is not limited to this particular example, as other bits and word options are possible.

At block 404, the method 400 determines a routing mode capability of the device, such as whether the device, e.g., end device 210, 220, supports a dynamic routing mode of communication. For example, communication management between the end device 210, 220 and the network device 230 can be managed through communications adapter 107 as part of a computer system 100 that includes the end device 210, 220. Configuration information regarding supported routing modes can be loaded into the communications adapter 107, read from a configuration file, or otherwise determined at the end device 210, 220. As one example, a network administrator may establish configurations at a port level and/or device level to constrain routing and other parameters through the switched fabric network 200. In another example, routing policies may be defined by the active operating system or firmware running on the end device 210, 220.

At block 406, one or more routing support bits in the fabric login payload can be configured based on the routing mode capability of the device. For example, a dynamic routing mode bit can be set in the fabric login payload 312. The one or more routing support bits can be used to indicate the capabilities of the device logging into the fabric and may be used to indicate support of static routing, and/or dynamic routing. Bit selection for other future routing modes may be considered. Further, the one or more routing support bits can include one or more extended routing mode support indicators to support modes beyond static and dynamic routing.

At block 408, the fabric login payload is sent to the switched fabric network to establish communication between the device and a network device of the switched fabric network, such as communication between end devices 210, 220 and network device 230 of switched fabric network 200. As a further example, the fabric login payload 312 can be sent from server 302 to a switching device 306 that has communication path available when the server 302 seeks to connect the switched fabric network of the switching device 306. Similarly, when the control unit 304 seeks to connect the switched fabric network of a switching device 306, the control unit 304 can send a fabric login payload 312 to the switching device 306. As one example, the fabric login payload 312 may be sent as part of one of the Fibre Channel Extended Link Services (ELS), such as FLOGI.

It will be understood that the method 400 can include additional steps. Furthermore, steps of method 400 can be combined, rearranged, or further subdivided. Thus, the sequence and content of method 400 can be modified within the scope of various embodiments.

Figure 5:
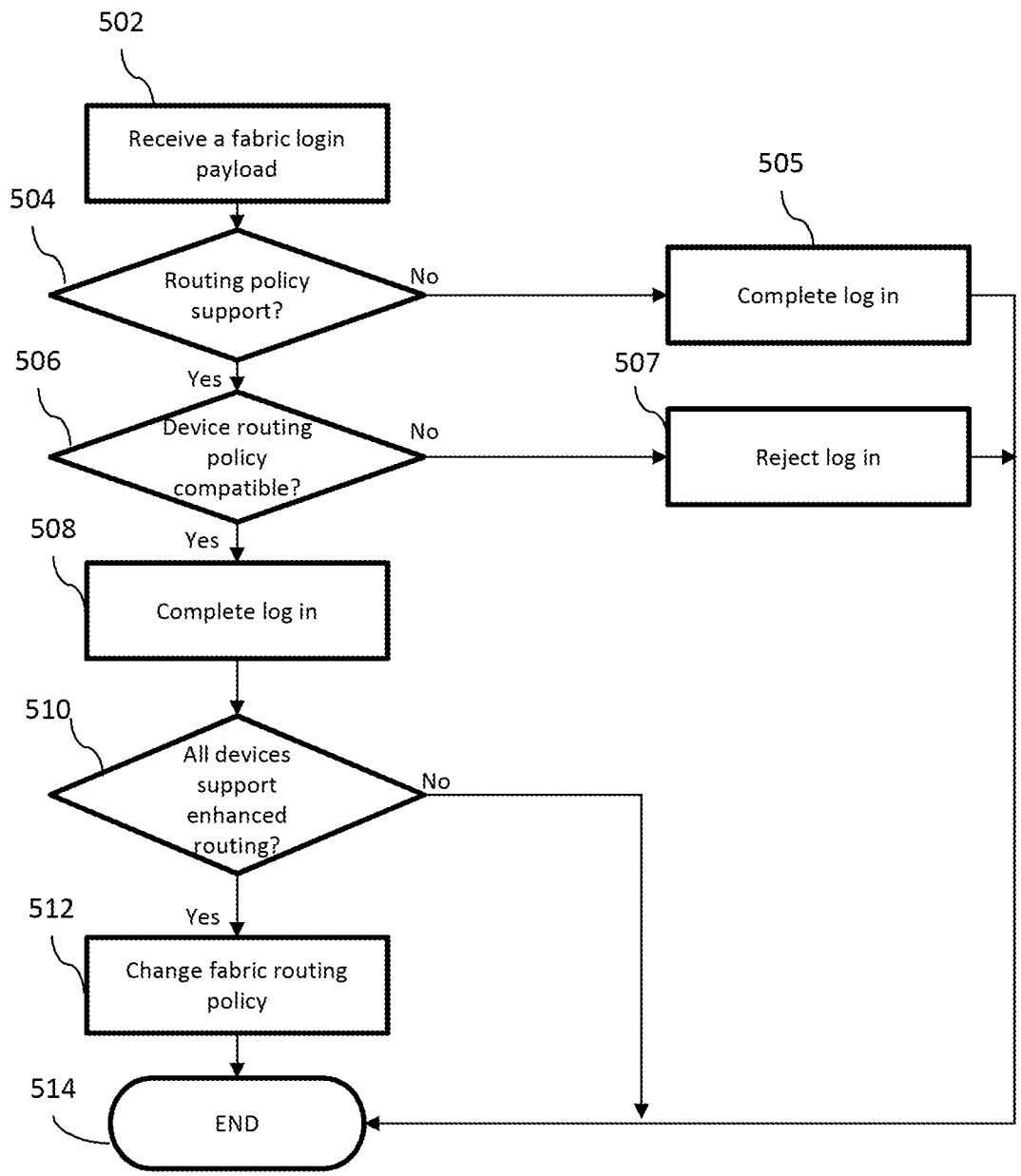
FIG. 5 depicts a flow diagram of a method for processing a fabric login payload with extended link services support, in accordance with another embodiment of the invention.

FIG. 5 depicts a flow diagram of a method 500 for processing a fabric login payload with routing support present in accordance with another embodiment of the invention. The method 500 is described in further reference to FIGS. 1-3 as a computer-implemented method.

At block 502, a fabric login request with a fabric login payload is received at a network device, such as the fabric login payload 312 at network device 230 or switching device 306. A fabric controller 308 can parse the fabric login payload 312 to examine and extract various parameters. For example, devices that support multiple routing modes may incorporate an extension for routing policy support defined in one or more routing support bits of common service parameters in the fabric login payload 312.

At block 504, the fabric controller 308 can determine whether the fabric login payload includes an extension for routing policy support. A bit field, version information, or examination of a reserved location may be used to determine whether the extension for routing policy support is included in the fabric login payload 312. If there is no extension support detected at block 504, then at block 505, the fabric login request completes the login process.

At block 506, the fabric controller 308 can determine whether a current routing policy of the network device is compatible with a routing mode defined in the fabric login payload 312 based on the extension for routing policy support. For example, the routing policy selector 310 can determine whether a setting of static routing, dynamic routing, or an alternate mode is consistent with a current routing policy of the network device 230 or switching device 306. One or more extended routing mode support indicators can be used to define other customized routing options.

At block 507, the fabric controller 308 can reject the fabric login request based on determining that the current routing policy of the network device is incompatible with the routing mode defined in the fabric login payload 312. For example, if the fabric login payload 312 does not indicate dynamic routing capability but the fabric network 200 is configured for dynamic routing, then the fabric login request cannot be fulfilled.

At block 508, the fabric controller 308 can complete the fabric login request based on determining that the current routing policy of the network device is compatible with the routing mode capability defined in the fabric login payload 312. For instance, if the current routing policy is dynamic routing and the fabric login payload 312 indicates a dynamic routing capability, then the fabric login request can be fulfilled.

At block 510, the fabric controller 308 can check whether all of the devices connected to the switched fabric network 200 support an enhanced routing mode, such as dynamic routing. This may be performed, for example, by monitoring a history of active links with a plurality of devices at the network device. The routing policy selector 310 can determine whether an alternate routing mode is supported by the devices based on the history of active links and trigger an action based on determining that the alternate routing mode is supported by the devices. The action may include changing the current routing policy to the alternate routing mode as depicted at block 512. Alternatively, the action may include sending a notification to an administrative system indicating that the alternate routing mode is supported by the devices. For instance, the administrative system can be one of the end device 210, 220 or an alternate device (not depicted). The notification can enable a user of the administrative system to verify the routing mode change or implement the routing mode change through an administrative tool.

It will be understood that the method 500 can include additional steps. Further steps of method 500 can be combined, rearranged, or further subdivided. Thus, the sequence and content of method 500 can be modified within the scope of various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e.

two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    building a fabric login payload at a device to establish a plurality of communication parameters with a switched fabric network;
    determining a routing mode capability of the device;
    configuring one or more routing support bits in the fabric login payload based on the routing mode capability of the device, wherein the one or more routing support bits comprise one or more predetermined bit fields in a common service parameters payload of a fabric login request for a switching device of the switched fabric network, and the one or more routing support bits distinguish between a static routing mode and a dynamic routing mode; and
    sending the fabric login payload to the switched fabric network to establish communication between the device and a network device of the switched fabric network.

2. The computer-implemented method of claim 1, wherein the one or more routing support bits are selectable between a plurality of routing modes.

3. The computer-implemented method of claim 2, wherein the one or more routing support bits comprise one or more extended routing mode support indicators.

4. The computer-implemented method of claim 1, wherein the switched fabric network is a storage area network.

5. The computer-implemented method of claim 1, wherein the routing mode capability of the device is determined based on one or more configuration parameters of the device.

6. The computer-implemented method of claim 1, wherein the routing mode capability of the device is configurable on a per-port basis.

7. The computer-implemented method of claim 1, wherein the one or more predetermined bit fields in the common service parameters payload of the fabric login request comprise a dynamic routing support bit and one or more alternate routing mode support bits.

8. A device comprising:
    a network interface of the device configured to communicate with a switched fabric network; and
    a processing system of the device configured to execute a plurality of instructions to:
        build a fabric login payload to establish a plurality of communication parameters with the switched fabric network;
        determine a routing mode capability of the device;
        configure one or more routing support bits in the fabric login payload based on the routing mode capability of the device, wherein the one or more routing support bits comprise one or more predetermined bit fields in a common service parameters payload of a fabric login request for a switching device of the switched fabric network, and the one or more routing support bits distinguish between a static routing mode and a dynamic routing mode; and
        send the fabric login payload to the switched fabric network through the network interface to establish communication between the device and a network device of the switched fabric network.

9. The device of claim 8, wherein the one or more routing support bits are selectable between a plurality of routing modes.

10. The device of claim 9, wherein the one or more routing support bits comprise one or more extended routing mode support indicators.

11. The device of claim 8, wherein the switched fabric network comprises a storage area network.

12. The device of claim 8, wherein the routing mode capability of the device is determined based on one or more configuration parameters of the device.

13. The device of claim 8, wherein the routing mode capability of the device is configurable on a per-port basis.

14. The device of claim 8, wherein the one or more predetermined bit fields in the common service parameters payload of the fabric login request comprise a dynamic routing support bit and one or more alternate routing mode support bits.

15. A computer program product comprising:
    a non-transitory computer-readable storage medium having program instructions embodied therewith, the program instructions readable by a processor of a device to cause the processor to:
        build a fabric login payload to establish a plurality of communication parameters with a switched fabric network;
        determine a routing mode capability of the device;
        configure one or more routing support bits in the fabric login payload based on the routing mode capability of the device, wherein the one or more routing support bits comprise one or more predetermined bit fields in a common service parameters payload of a fabric login request for a switching device of the switched fabric network, and the one or more routing support bits distinguish between a static routing mode and a dynamic routing mode; and
        send the fabric login payload to the switched fabric network to establish communication between the device and a network device of the switched fabric network.

16. The computer program product of claim 15, wherein the one or more routing support bits are selectable between a plurality of routing modes.

17. The computer program product of claim 16, wherein the one or more routing support bits comprise one or more extended routing mode support indicators.

18. The computer program product of claim 15, wherein the switched fabric network comprises a storage area network.

19. The computer program product of claim 15, wherein the routing mode capability of the device is determined based on one or more configuration parameters of the device, and the routing mode capability of the device is configurable on a per-port basis.

20. The computer program product of claim 15, wherein the one or more predetermined bit fields in the common service parameters payload of the fabric login request comprise a dynamic routing support bit and one or more alternate routing mode support bits.

\* \* \* \* \*